United States Patent
Kopetzky

(10) Patent No.: US 6,213,420 B1
(45) Date of Patent: Apr. 10, 2001

(54) SAFETY BELT APPARATUS WITH AN ACCELERATION SENSOR

(75) Inventor: Robert Kopetzky, Lonsee (DE)

(73) Assignee: Takata (Europe) Vehicle Safety Technology GmbH (DE)

( * ) Notice: Subject to any disclaimer, the term of this patent is extended or adjusted under 35 U.S.C. 154(b) by 0 days.

(21) Appl. No.: 09/369,194

(22) Filed: Aug. 6, 1999

(30) Foreign Application Priority Data

Aug. 6, 1998 (DE) .............................................. 198 35 673

(51) Int. Cl.[7] .................................................. B60R 22/40
(52) U.S. Cl. ...................................... 242/384; 242/384.5
(58) Field of Search ............................... 242/384, 384.2, 242/384.5, 384.6, 383.2; 280/806; 297/478

(56) References Cited

U.S. PATENT DOCUMENTS

| | | | |
|---|---|---|---|
| 4,168,810 | * | 9/1979 | Sack et al. .......................... 242/383.2 |
| 4,190,213 | * | 2/1980 | Ueda .................................. 242/384.2 |
| 4,453,681 | * | 6/1984 | Gueguen et al. ................... 242/383.2 |
| 4,483,495 | | 11/1984 | Honl . |
| 4,760,975 | | 8/1988 | Doty . |
| 4,979,695 | * | 12/1990 | Matsuki et al. ..................... 242/384.6 |
| 5,443,224 | * | 8/1995 | Patterson et al. .................. 242/384.2 |

FOREIGN PATENT DOCUMENTS

| | | |
|---|---|---|
| 24 02 921 | 8/1975 | (DE) . |
| 80 09 960 | 8/1980 | (DE) . |
| 34 31 911 | 5/1986 | (DE) . |
| 2 131 279 | 6/1984 | (GB) . |
| 87/06545 | 11/1987 | (WO) . |

* cited by examiner

Primary Examiner—John M. Jillions
(74) Attorney, Agent, or Firm—Foley & Lardner

(57) ABSTRACT

The invention relates to a safety belt apparatus with a belt roller (11) which is preferably subjected to a bias force in the wind-up direction by a spring and onto which a seat belt (12) is wound up to a greater or a lesser extent, with an acceleration sensor (13) with a movable mass (19) and an auxiliary pawl (15) which is impacted by the latter controlling with the auxiliary pawl (15) a position control ratchet wheel (14) which in turn acts via a transmission (16) on a main pawl (17) which is rotationally fixedly connected to the belt roller (11) in order that the latter engages into a main ratchet crown (18) during the blocking of the position control ratchet wheel (14) by the auxiliary pawl (15) in order to stop the further drawing out of the belt (12). In this the invention provides that the auxiliary pawl (15) is formed at a spring element (20) which damps the thrust movements which are directed against the position control ratchet wheel during the back and forth movement of the mass (19) in such a manner that the rattling noises arising in this are damped to a largely disturbance-free measure.

20 Claims, 1 Drawing Sheet

SAFETY BELT APPARATUS WITH AN ACCELERATION SENSOR

The invention relates to a safety belt apparatus with an acceleration sensor.

BACKGROUND OF THE INVENTION

A safety belt apparatus of this kind is known for example from GB 2 131 279. Its principle is based on the fact that an acceleration sensor which is equipped with a sphere as a movable mass has a pawl which is pivotal about a transverse axis and which engages into a tooth at the periphery of a position control ratchet wheel in horizontal movements of the sphere as a result of accelerations or decelerations, through which the position control ratchet wheel, which is connected in a rotationally fixed manner via a transmission to the belt roller, is abruptly braked. Since the belt is drawn further out, the transmission, which is provided between the position control ratchet wheel and the main pawl, experiences a moving out of the main pawl in order that the latter engages into the main ratchet crown and thus stops the drawing out movement of the belt.

A problem in acceleration sensors operating in this manner consists in that the movable mass moves back and forth in the free space surrounding it as a result of the vibrations during normal travel, with the auxiliary pawl also being continually pivoted back and forth. In this it strikes again and again at the outer periphery of the position control ratchet wheel, which leads to disagreeable rattling noises.

SUMMARY OF THE INVENTION

The object of the invention consists in providing a safety belt apparatus of the initially named kind in which rattling noises of the acceleration sensor and of the parts connected to it during normal travel are largely forestalled.

The idea of the invention is thus to be seen in providing the pawl at a spring element which damps thrusts which arise during the striking against the position control ratchet wheel to such an extent that the development of rattling noise is at least greatly reduced.

Advantageous further developments are characterised by the path limiting means between the limbs receiving an especial significance.

BRIEF DESCRIPTION OF THE DRAWING

The invention will be explained in the following in an exemplary manner with reference to the drawings; in these are shown.

DETAILED DESCRIPTION OF THE INVENTION

Figure 1:
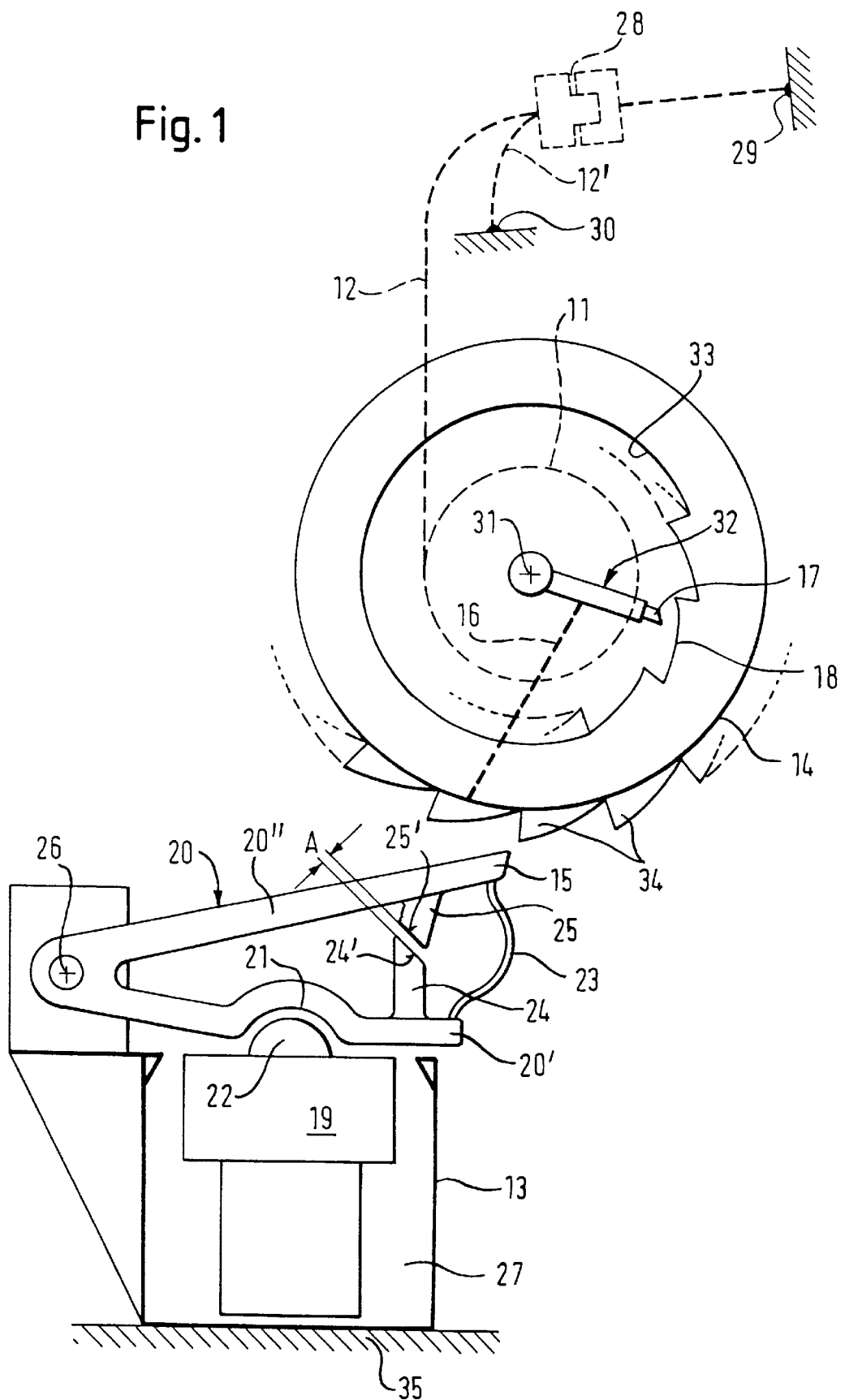
FIG. 1 a schematic side view of an advantageous embodiment of a safety belt apparatus in accordance with the invention, with the acceleration sensor and the components cooperating with it being reproduced at a strong magnification.

In accordance with FIG. 1 a safety belt apparatus in accordance with the invention has a seat belt 12 which is wound up on a belt roller 11 to a greater or lesser extent and which leads via a belt lock 28 to a securing point 29 at the vehicle body. A further belt part 12' extends from the belt lock 28 to a further securing point 30 at the vehicle body. It is thus a matter of a usual three point belt.

Rotationally fixedly connected to the belt roller 11 or to its shaft 31 respectively is a pawl mechanism 32 which has an outwardly movable main pawl 17 which can be moved outwards via a transmission 16, which is only indicated in broken lines, in such a manner that it engages into an inner main ratchet crown 18 which is provided at the periphery of an opening 33 in the vehicle-fixed housing of the belt roller, which is otherwise not illustrated in detail.

Coupled in a rotationally fixed manner to the belt roller shaft 31 via the transmission 16 is a position control ratchet wheel 14 which is coaxial with the main ratchet crown 18 and which is provided at its outer periphery with blocking teeth 34.

At a housing 35 of the belt roller, which is not illustrated in detail, is secured an acceleration sensor 13 which consists of a movable mass 19, which is defined in its freedom of movement in a confinement 27 and which can also be formed as a sphere, and a spring element 20 which is pivotal about a pivotal transverse axis 26 and which had two limbs 20', 20" which stand in V shape relative to one another, with the pivotal transverse axis 26 being provided at the apex of the V and extending parallel to the belt roller shaft 31.

The lower, or control limb 20' is provided with a lower depression 21 which extends upwardly in the manner of a spherical section and into which an upper projection 22 of the movable mass 19, which is correspondingly formed in the shape of a spherical section, engages. The projection 22 can also be formed by the crown of a sphere. In horizontal accelerations and decelerations of the movable mass 19 or tiltings of the vehicle respectively, the projection 22 is displaced within the depression 21 to the one side or the other, with the projection 22 attempting to slide out of the depression 21 and in the process pivoting the V-shaped spring element 20 upwardly about the transverse axis 26 until the auxiliary pawl 15 which is provided at the front end of the upper limb 20" engages between two teeth 34 of the position control ratchet wheel 14. Through this a clockwise rotational movement of the position control ratchet wheel 14 which arises when the belt 12 is drawn out is stopped. Since the belt roller 11 however continues to rotate when the drawing out of the belt 12 is continued, an actuation of the transmission 16 takes place as a result of the relative movement between the pawl mechanism 32 and the position control ratchet wheel 14, which leads to the moving out of the main pawl 17, which then comes into engagement with a tooth of the main ratchet crown 18, whereupon the further drawing-out movement of the belt 12 is stopped.

Between the ends of the limbs 20', 20" which face away from the transverse axis 26 there extends a draw member 23 in the form of a plastic fibre which determines the largest opening angle of the V-shaped spring element 20. This is advantageous because otherwise in the course of the lifetime of a motor vehicle it could happen that the V-angle of the spring element 20 opens through long term deformation and an engagement of the pawl 15 into the outer toothed crown of the position control ratchet wheel 14 could also take place already without a movement of the mass 19. The draw member 23 should consist of a material which does not stretch in the long term.

In addition abutment webs 24, 25 extend from the end regions of the limbs 20', 20", in each case in the direction of the other limb. The free end surfaces 24', 25" of the two abutment webs 24, 25 end in the non-tensioned state at a distance A which is chosen in such a manner that the spring deflection of the spring element 20 is limited to a value which is sufficient for the desired noise damping. The end surfaces 24', 25' preferably extend at an inclination relative to the direction of movement of the abutment webs 24, 25 so that when the end surfaces 24', 25' strike one another a certain sliding movement between the end surfaces 24', 25' takes place in the presence of a further resilient deformation of the spring element 20. Through this an increased damping is achieved at the end of the spring deflection.

As a result of the design in accordance with the invention, rattling noises are strongly damped, which would otherwise be produced during normal travel by the pivoting back and forth of the movable mass 19 and the V-shaped spring element 20.

The end surfaces 24', 25' are placed at an inclination in such a manner that they extend at least substantially parallel to one another.

What is claimed is:

1. A safety apparatus for a motor vehicle, the apparatus comprising:
   a housing;
   a belt roller disposed in the housing and adapted for winding and unwinding a seat belt;
   a main ratchet crown disposed in the housing;
   a pawl mechanism rotationally fixedly connected to the belt roller at a central axis of the belt roller and having an outwardly movable main pawl engageable with he main ratchet crown;
   a spring element pivotally disposed in the housing and having an upper limb and a lower limb, wherein the lower limb includes a depression;
   an acceleration sensor mounted in the housing and having an upwardly extending projection engageable with the depression of the lower limb of the spring element;
   a position control ratchet wheel rotationally fixedly coupled to the belt roller; and
   an auxiliary pawl mounted to the upper limb of the spring element and engageable with the control ratchet wheel such that when the auxiliary pawl engages the position control ratchet wheel, the main pawl engages the main ratchet crown to block further unwinding of the seat belt;
   further comprising a flexible draw member between the upper and lower limbs of the spring element to limit the distance therebetween,
   wherein the upper limb has an upper abutment web and the lower limb has a lower abutment web and the upper and lower abutment webs extend toward one another.

2. A safety apparatus as claimed in claim 1, further comprising a transmission that couples the position control ratchet wheel and pawl mechanism.

3. A safety apparatus as claimed in claim 1, wherein the acceleration sensor includes a movable mass that moves in the housing.

4. A safety apparatus as claimed in claim 1, wherein the upper and lower limbs of the spring element can be resiliently displaced with respect to one another.

5. A safety apparatus as claimed in claim 1, wherein the shaped spring element is pivotal about a transverse axis.

6. A safety apparatus as claimed in claim 1, wherein the belt roller has a central shaft and the pawl mechanism is rotationally fixedly connected to the central shaft.

7. A safety apparatus as claimed in claim 1, wherein an angle between the upper and lower limbs of the spring element is between 20 and 70 degrees.

8. A safety apparatus as claimed in claim 7, wherein an angle between the upper and lower limbs of the spring element between 30 and 60 degrees.

9. A safety apparatus as claimed in claim 8, wherein the angle between the upper and lower limbs of the spring element is 45 degrees.

10. A safety apparatus as claimed in claim 1, wherein the spring element is substantially V-shaped.

11. A safety apparatus for a motor vehicle, the apparatus comprising:
    a housing;
    a belt roller disposed in the housing and adapted for winding and unwinding a seat belt;
    a main ratchet crown disposed in the housing;
    a pawl mechanism rotationally fixedly connected to the belt roller at a central axis of the belt roller and having an outwardly movable main pawl engageable with the main ratchet crown;
    a spring element pivotally disposed in the housing and having an upper limb and a lower limb, wherein the lower limb includes a depression;
    an acceleration sensor mounted in the housing and having an upwardly extending projection engageable with the depression of the lower limb of the spring element;
    a position control ratchet wheel rotationally fixedly coupled to the belt roller; and
    an auxiliary pawl mounted to the upper limb of the spring element and engageable with the control ratchet wheel such that when the auxiliary pawl engages the position control ratchet wheel, the main pawl engages the main ratchet crown to block further unwinding of the seat belt,
    further comprising a flexible draw member between the upper and lower limbs of the spring element to limit the distance therebetween.

12. A safety apparatus as claimed in claim 11, wherein the draw member is plastic.

13. A safety apparatus for a motor vehicle, the apparatus comprising:
    a housing;
    a belt roller disposed in the housing and adapted for winding and unwinding a seat belt;
    a main ratchet crown disposed in the housing;
    a pawl mechanism rotationally fixedly connected to the belt roller at a central axis of the belt roller and having an outwardly movable main pawl engageable with the main ratchet crown;
    a spring element pivotally disposed in the housing and having an upper limb and a lower limb, wherein the lower limb includes a depression;
    an acceleration sensor mounted in the housing and having an upwardly extending projection engageable with the depression of the lower limb of the spring element;
    a position control ratchet wheel rotationally fixedly coupled to the belt roller; and
    an auxiliary pawl mounted to the upper limb of the spring element and engageable with the control ratchet wheel such that when the auxiliary pawl engages the position control ratchet wheel, the main pawl engages the main ratchet crown to block further unwinding of the seat belt
    wherein the upper limb has an upper abutment web and the lower limb has a lower abutment web and the upper and lower abutment webs extend toward one another.

14. A safety apparatus as claimed in claim 13, wherein the upper and lower abutment webs are resiliently deflectable with respect to one another and are separated by a distance in a relaxed state to define a predetermined maximum deflection of the upper and lower limb.

15. A safety apparatus as claimed in claim 13, wherein end surfaces of the upper and lower abutment webs are inclined with respect to a direction in which the abutment webs are displaced.

16. A safety apparatus as claimed in claimed 15, wherein an angle of inclination of the end surfaces of the abutment webs is between 30 and 60 degrees with respect to the direction in which the abutment webs are displaced.

17. A safety apparatus as claimed in claim 16, wherein the angle of inclination is 45 degrees.

18. A safety apparatus for a motor vehicle, the apparatus comprising:

a housing;

a belt roller disposed in the housing and adapted for winding and unwinding a seat belt;

a main ratchet crown disposed in the housing;

a pawl mechanism rotationally fixedly connected to the belt roller at a central axis of the belt roller and having an outwardly movable main pawl engageable with the main ratchet crown;

a spring element pivotally disposed in the housing and having an upper limb and a lower limb;

an acceleration sensor mounted in the housing and having an upwardly extending projection engageable with the lower limb of the spring element;

a position control ratchet wheel rotationally fixedly coupled to the belt roller;

an auxiliary pawl mounted to the upper limb of the spring element and engageable with the control ratchet wheel such that when the auxiliary pawl engages the position control ratchet wheel, the main pawl engages the main ratchet crown to block further unwinding of the seat belt;

the end regions of the limbs of the spring element being limited to a maximum distance by a flexible draw member.

19. A safety apparatus for a motor vehicle, the apparatus comprising:

a housing;

a belt roller disposed in the housing and adapted for winding and unwinding a seat belt;

a main ratchet crown disposed in the housing;

a pawl mechanism rotationally fixedly connected to the belt roller at a central axis of the belt roller and having an outwardly movable main pawl engageable with the main ratchet crown;

a spring element pivotally disposed in the housing and having an upper limb and a lower limb;

an acceleration sensor mounted in the housing and having an upwardly extending projection engageable with the lower limb of the spring element;

a position control ratchet wheel rotationally fixedly coupled to the belt roller;

an auxiliary pawl mounted to the upper limb of the spring element and engageable with the control ratchet wheel such that when the auxiliary pawl engages the position control ratchet wheel, the main pawl engages the main ratchet crown to block further unwinding of the seat belt;

abutment webs extending towards one another from the limbs of the spring element and having a distance in the relaxed state of the spring element such that a definite spring deflection distance is ensured.

20. A safety apparatus for a motor vehicle, as claimed in claim 19, wherein end regions of the limbs of the spring element being limited to a maximum distance by a flexible draw member.

* * * * *